United States Patent [19]

Schnall et al.

[11] 4,141,649

[45] Feb. 27, 1979

[54] OPTICAL PROJECTION SYSTEM FOR COPYING APPARATUS

[75] Inventors: Günther Schnall, Eching; Hanns Blöchl, Unterhaching, both of Fed. Rep. of Germany

[73] Assignee: AGFA-Gevaert AG, Leverkusen, Fed. Rep. of Germany

[21] Appl. No.: 823,001

[22] Filed: Aug. 8, 1977

[30] Foreign Application Priority Data

Aug. 20, 1976 [DE] Fed. Rep. of Germany ....... 2637514

[51] Int. Cl.$^2$ ............................................. G03B 27/48
[52] U.S. Cl. ..................................................... 355/51
[58] Field of Search ................... 350/167; 355/47–52, 355/55–57, 60, 66, 8, 11, 67, 71

[56] References Cited

U.S. PATENT DOCUMENTS

| | | | |
|---|---|---|---|
| 2,094,330 | 9/1937 | Räntsch | 355/66 X |
| 3,580,675 | 5/1971 | Hieber et al. | 355/50 |
| 3,592,542 | 7/1971 | Käufer et al. | 355/50 |
| 3,712,727 | 1/1973 | Bonnet | 350/167 X |

FOREIGN PATENT DOCUMENTS

| | | | |
|---|---|---|---|
| 2536721 | 3/1976 | Fed. Rep. of Germany | 355/50 |
| 1203904 | 9/1970 | United Kingdom | 355/50 |

OTHER PUBLICATIONS

I.B.M. Technical Disclosure Bulletin, Short Length Optical System, Wohl, vol. 13, No. 10, 3/71, p. 2947.

*Primary Examiner*—Donald A. Griffin
*Attorney, Agent, or Firm*—Michael J. Striker

[57] ABSTRACT

Relative movement is effected between an original to be copied and an optical projection system. During such movement, the projection system projects the image of successive strip-shaped portions of the original onto successive strip-shaped portions of a recording medium, to form a gap-free reproduction of the original. The projection system includes a plurality of optical elements at least two of which are of positive refractive power and project an image of a strip-shaped portion of the original into an intermediate image plane and from there onto the recording medium. At least one of the optical elements of the projection system comprises an element having a lenticular layer of positive refractive power and a reflective layer combined therewith.

16 Claims, 7 Drawing Figures

OPTICAL PROJECTION SYSTEM FOR COPYING APPARATUS

BACKGROUND OF THE INVENTION

The invention relates to optical projection systems for copying machines, of the type in which relative movement is effected between the original and the projection system and the projection system projects onto the recording medium images of successive strip-shaped portions of the original. In projection systems of this type, the objective system comprises a plurality of component objectives arranged one after the other, each of which includes at least two elements of positive refractive power located to either side of an intermediate image plane, with the component images within the intermediate image plane being projected onto the recording medium to form a complete image of the original which is at least free of gaps, i.e., the component images adjoin each other exactly or even overlap.

As an example of this type of projection system, referred to hereinafter for the sake of brevity as a raster objective, is disclosed in commonly owned U.S. Pat. No. 3,592,542.

SUMMARY OF THE INVENTION

It is a general object of the invention to provide a projection system of the type in question which is inherently of very compact dimensions and which, despite the use of optical components which are particularly simple to manufacture, produces images of high optical quality.

According to one concept of the invention, this is achieved by forming at least one of the optical elements participating in the projection operation from a lenticular surface of positive refractive power combined with a reflective surface. Preferably, use is made of what is referred to herein as a mirror-objective, in which a lenticular element is arranged in such close proximity to a reflective surface that the light of the projection light path passes through the lenticular element twice on its way from the original to the recording medium.

The use of lenticular elements combined with reflective elements makes it possible to establish a projection light path having bends or zig-zags which inherently tend to reduce the overall dimensions of the system and which furthermore make the use of separate deflecting mirrors unnecessary. This possibility has particular meaning for the short optical paths and short overall dimensions possible with raster objective systems. With raster objectives, there is the theoretical possibility of reducing the overall optical length of the system without limit; then it is necessary to correspondingly increase the number of raster elements employed in the succession of raster elements, in order to achieve a sufficiently large exposure field despite the decrease in dimensions of the individual elements. However, with this technique, difficulties arise in the introduction into the system of the light required for projection. The inventive use of combined reflective and lenticular elements makes it possible to further reduce the dimensions of the system and its components without involving problems in implementing the configuration then required for the system.

When it is necessary that the image formed on the recording medium be inverted or reverted, but the overall optical length of the projection system has already been made so short that the introduction of a separate mirror for this purpose is largely precluded, the present invention is of particular applicability.

Thus, the inventive projection system can be used in copying machines of the type in which a normal (not inverted or reverted) image is formed on the copying material only after an image transfer or offset operation from off an intermediate recording medium, such as for example in the conventional electrophotographic method; however, the inventive projection system is likewise easily adapted for direct projection of a normal (not inverted or reverted) image. Accordingly, the inventive system is suitable for all types of copying processes, including those which do not employ intermediate recording media, such as for example the direct electrophotographic method, the photocopy process and diazo processes.

The inventive use of combined lenticular and reflective elements has a further advantage. Using lenticular surfaces having only slight curvature through which the projection light is caused to pass twice during its travel from the original to the recording medium, it is nevertheless possible to achieve relatively high refractive powers. This is of particular significance in raster objective systems whose projection elements are usually parts of one-piece lenticular bars made of injection molded synthetic plastic, because with lenticular elements of only slight curvature structural and optical defects make themselves felt in the ultimate image to a considerably lesser degree than otherwise.

According to an advantageous concept of the invention, a lenticular bar serving as a field lens is located in the aforementioned intermediate image plane. Preferably, to prevent the intermediate image from being affected by defects or imperfections in the optical components, use is made of two component lenticular bars located to either side of the intermediate image plane, i.e., so that the intermediate image plane will be located in free space and not within optical material.

According to an advantageous concept of the invention, the projection light path is bent over into Z-configuration by means of two mirror-objective bars arranged between the original and the recording medium.

According to a further concept of the invention, a mirror-objective bar is employed as a field-lens bar.

The portion of the original and the portion of the recording medium from which and onto which the projection light is projected at any given moment are generally parallel to each other. Arranged in front of the aforementioned field-lens bar is a double objective bar, comprised of two rows of objective elements. One part of the projection light path extends through one row of objective elements, and another part of the projection light path extends through the other row of objective elements. The parts of the projection light path extending through the two rows of objective elements are approximately parallel to the original and to the recording medium. A deflecting mirror is used to deflect light from the original into the system just described, and another deflecting mirror is used to deflect light from this system onto the recording medium. This advantageous system makes possible very simple construction and compact dimensions for a projection system capable of direct projection of normal (not inverted or reverted) images onto the recording medium, e.g., a photosensitive recording medium such as used for example in ZnO methods, diazo methods or silver diffusion methods. Advantageously, the double objective bar has a bend; the bend angle is equal to twice the angle which the aforementioned parts of the projection light path include with the original and with the recording medium, respectively. As a result, the aforementioned parts of the projection light path extend through the two rows of objective elements of the double objective bar generally parallel to the optical axes thereof.

According to another concept of the invention, use is made of a field-lens bar provided with a reflective back layer, an objective bar provided with a reflective back layer and a further objective bar, the two objective bars preferably being integral portions of a single bar; with this arrangement, the projection light path is of Z-shaped configuration. This system projects onto the recording medium an image which will be normal (not reverted or inverted) after the performance of an image-transfer or offset operation. Accordingly, it is adapted for copying methods involving the production of an intermediate image which is to be transferred onto copy material. The provision of the two positive projection components of the system on one bar minimizes the effect upon the ultimate image quality of temperature fluctuations, or the like, arising during operation of the copying machine.

A particularly compact version of the inventive system is produced when the projection light path is bent four times, by means of a double mirror-objective bar, a field-lens bar provided with a reflective back layer, a deflecting mirror or alternatively two rows of concave mirrors of positive refractive power, a bar provided with a row of concave mirrors and serving as a field-lens bar, and a deflecting mirror.

According to an advantageous concept of the invention, the lenticular bars are made of transparent synthetic plastic molded around an embedded plate of opaque synthetic plastic provided with apertures serving as the apertures for the lenticular components of the lenticular bars.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
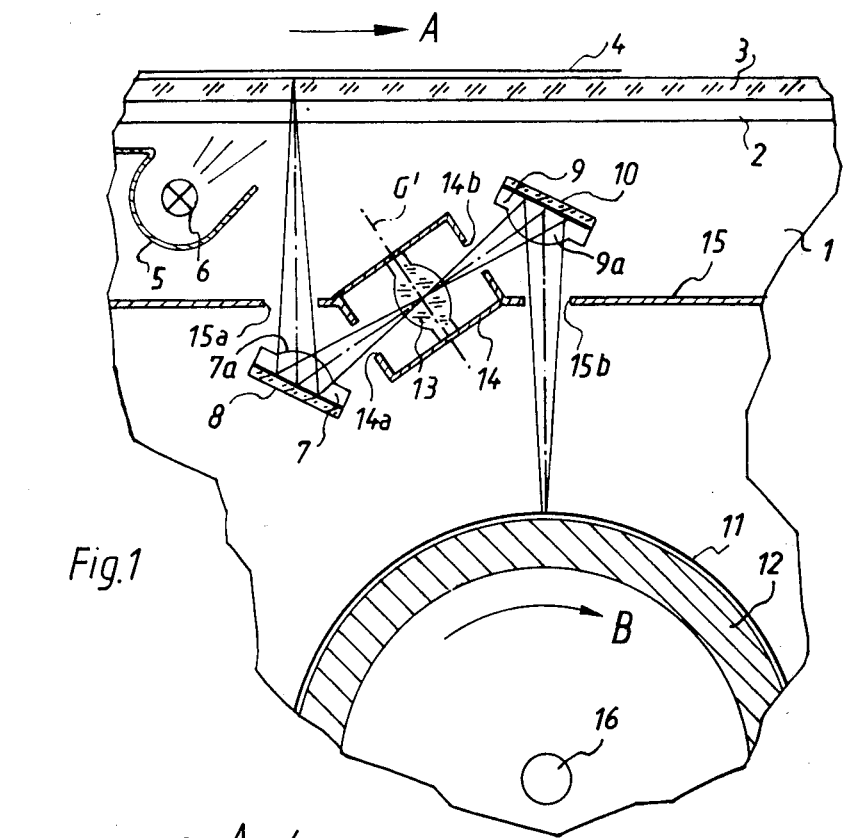
FIG. 1 depicts a first embodiment, utilizing two lenticular bars provided with reflective back layers.

In the embodiment of FIG. 1, numeral 1 denotes the housing of a copying machine on which a carrier 2 is mounted for longitudinal sliding movement. The carrier 2 supports a transparent plate 3 upon which an original 4 to be copied can be laid. During the projection operation, the original 4 is moved in the direction of arrow A and illuminated by means of a light source 6 arranged within a reflector 5.

Mounted in the housing 1 are one-piece lenticular bars 7, 9 made of injection-molded transparent synthetic plastic. The one-piece lenticular bars 7, 9 are each provided with lenticular surfaces 7a, 9a and behind those reflective layers 8, 10. The rows of lenticular elements formed by the lenticular surfaces 7a, 9a are of positive refractive power. The lenticular bar 7 projects an image of a strip-shaped portion of the original 4, as the latter is transported in direction A, into an intermediate focal plane G', from where this image of the original is picked up by lenticular bar 9 and projected onto the surface of a copying drum 12 which rotates in direction B on its shaft 16 and is provided with a photosensitive layer 11. In this way, the images of successive strip-shaped portions of the original are projected onto the photosensitive layer at unity (1:1) magnification. The drum 12 can, for example, be the intermediate recording medium of an indirect electrophotographic copying device, with incident light forming thereon a latent image which is subsequently "inked" using electroscopically attractable toner.

Arranged in the intermediate image plane G' is a field-lens lenticular bar 13 provided with field-lens lenticular surfaces 13a, 13b forming a row of field-lens elements of positive refractive power. The field-lens surfaces 13a, 13b project the exit pupils of the lens elements 7a of lenticular bar 7 onto the entrance pupils of the lens elements 9a of lenticular bar 9 and accordingly serve to transmit the light rays passing through the portions of the lens elements 7a farthest from the optical axes of the latter; accordingly, each individual channel of the rowwise arranged projection system is capable of receiving and projecting light over a relatively large angular region. The images of the individual channels of the projection system, due to the intermediate projection into the image plane G', are at the actual projection plane reassembled into a gapless image, or can even be made to overlap with with one another, because the individual images after being twice inverted by the projection system are projected onto the copying drum 12 one next to the other with their original relative orientations reestablished.

In order to minimize the effect of stray light, and in order to establish definite limits for the strip-shaped portion of the original to be projected at any one time, the field-lens lenticular bar 13 is arranged in a rectangular tube 14 provided with slit-shaped entrance and exit apertures 14a, 14b through which light transmitted through tube 14 must pass. Additionally, a light-shield wall 15 is provided intermediate the plane of the original and the plane (or surface) of the recording medium (here the photosensitive layer 11); wall 15, likewise, is provided with slit-shaped apertures 15a, 15b for the transmission of the light of interest.

Figure 2:
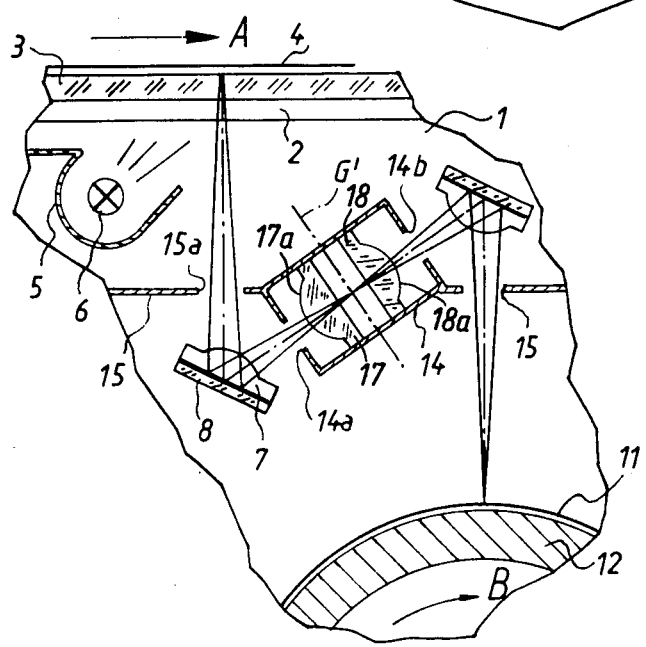
FIG. 2 depicts a modification of the first embodiment, in which the field-lens bar is split.

The embodiment depicted in FIG. 2 is similar to that of FIG. 1. Here, however, use is made of two field-lens lenticular bars 17, 18 provided with positive lenticular surfaces 17a, 18a, the two bars 17, 18 being located to either side of the intermediate image plane G'. These twin field-lens bars 17, 18 perform in substantially the same way as the simple field-lens bar 13 of FIG. 1. However, they permit the formation of the image at intermediate plane G' in free space, so that the intermediate image at plane G' cannot be interfered with by schlieren effects within the lenticular bodies nor by cracks or dust particles which may be present on the lenticular surfaces of the optical components.

Figure 3:
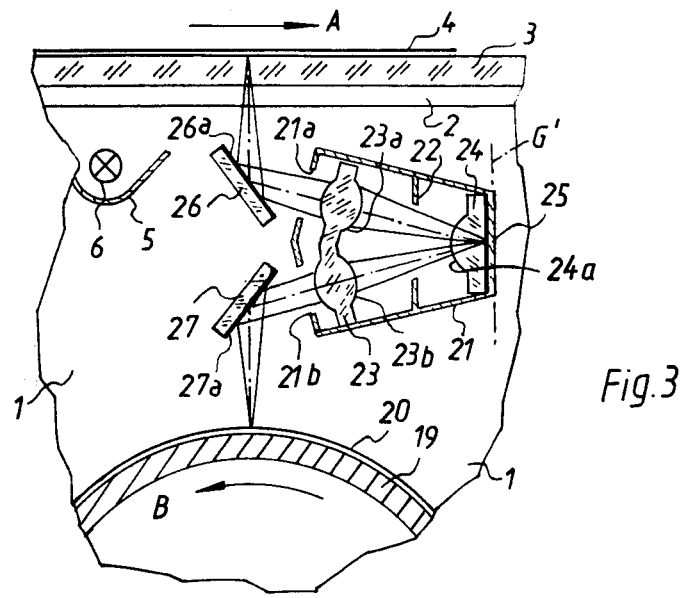
FIG. 3 depicts a third embodiment, utilizing a field-lens bar with a reflective back layer.

In the embodiment of FIG. 3, there is provided between the original carrier 2, 3 and a transport drum 19 for a photosensitive sheet 20 an optical tube 21 provided with a slot-shaped aperture 22. At its left end, the tube 21 is provided with slot-shaped entrance and exit openings 21a, 21b. Accommodated within the tube 21 is a double objective bar 23 the upper and lower sections of which each include a respective row of lenticular elements 23a, 23b. The configuration of lens bar 23 is angled, and the angle of bend is such that its rows of lenticular elements 23a, 23b are oriented such that the chief rays of the light path of the projection system pass through these lenticular elements parallel to the optical axes of the rows of lenticular elements.

Also arranged within the tube 21 is a field-lens lenticular bar 24 provided with a row of lens elements 24a of positive refractive power, back of which the lenticular bar 24 is provided with a reflective layer 25. Arranged externally of the tube 21 are deflecting mirrors 26, 27 which deflect light from the original into the tube 21 and light from the tube 21 onto the recording medium 20. In this embodiment, the participation of the three reflective surfaces in the projection operation results in the direct formation upon the recording medium 20 of a normal (not inverted or reverted) image, i.e., which need not be converted into normal form using a transfer or offset step, but which instead can be directly developed and fixed.

Figure 4:
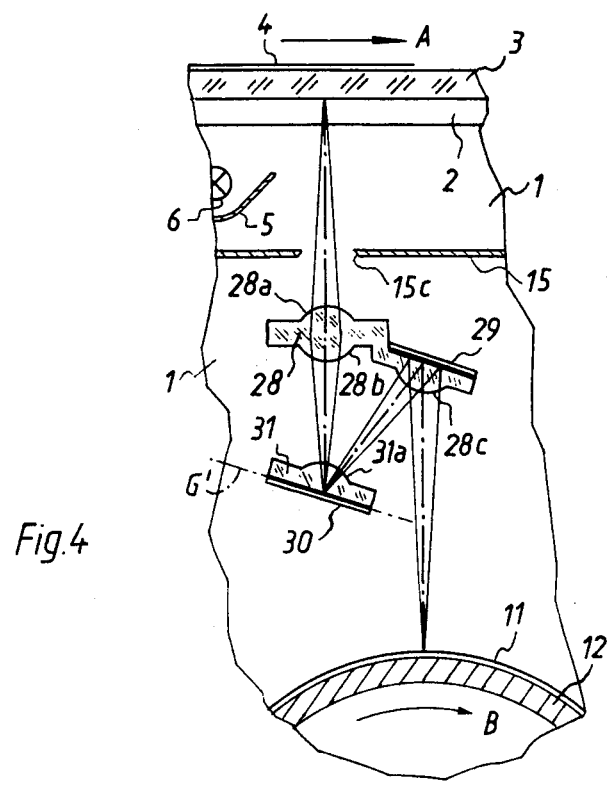
FIG. 4 depicts a fourth embodiment, in which both a projection-lens bar and also a field-lens bar are provided with reflective back layers.

In the embodiment shown in FIG. 4, the image of the original 4 is projected using a double objective lenticular bar 28. The formation of an intermediate image in the intermediate image plane G' is effected by means of the rows of lenticular surfaces 28a and 28b, whereas the projection of the intermediate image onto the photosensitive layer 11 is effected by means of the lenticular elements 28c adjoining an integral reflective layer 29. The action of a field lens is afforded by a field-lens lenticular bar 31 provided with a row of lenticular elements 31a and a reflective layer 30. The shielding of the photosensitive layer 11 from stray light and the definition of the strip on the image to be projected are again effected using a light-shield wall 15 provided with an exposure slot 15c.

Figure 5:
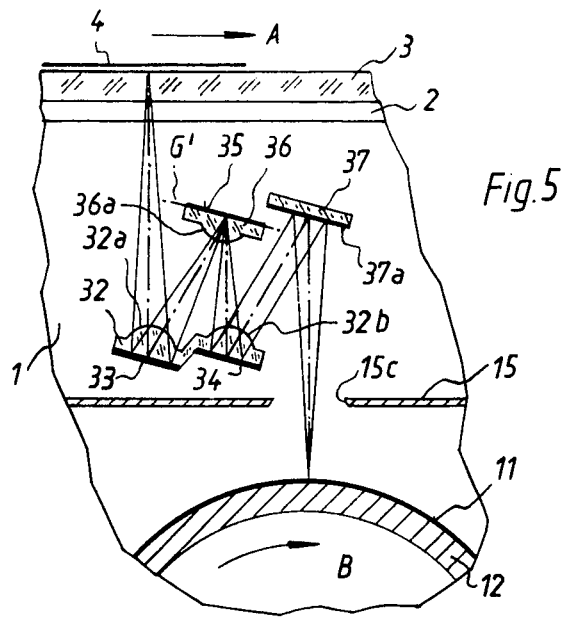
FIG. 5 depicts a fifth embodiment in which the projection light path has four bends.

In the embodiment of FIG. 5, both the projection of the intermediate image into the intermediate image plane G' and also the projection of the image onto the photosensitive layer 11 are effected by means of a double lens bar 32 provided with two rows of lenticular elements 32a, 32b and two cooperating reflective surfaces 33, 34. The illustrated projection system additionally includes a field-lens bar 36 provided with a row of lenticular surfaces 36a and with a reflective layer 37. The four reflective layers employed in this embodiment establish a light path having four bends, which makes for a very compact construction of the projection system. Stray light is again shielded from the photosensitive layer by means of an intermediate wall 15 provided with an exposure slot 15c.

Figure 6:
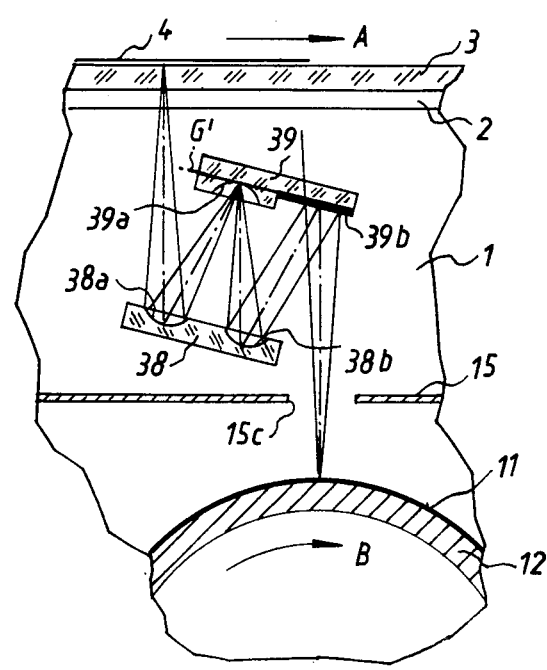
FIG. 6 depicts a sixth embodiment in which the projection system is made up of mirror-objective bars.

FIG. 6 depicts an embodiment in which all projection operations performed by the projection system are performed by reflective surfaces. Even though each projection of a portion of the strip on the original is performed by a single convergent surface, the quality of the projected image of the original is relatively high, even for the projection of multicolor originals, at least for the image angle of raster-type objectives. The system of FIG. 6 includes a mirror bar 38 provided with two rows of concave mirrored surfaces 38a, 38b. The mirror row 38a projects the original 4 into the intermediate image plane G', from which the image of the original is projected by the mirror row 38b onto the photosensitive layer 11. A further bar 39 is provided with a row of concave reflective surfaces 39a and with a reflective surface 39b operative as a deflecting mirror. This embodiment, like that of FIG. 5, effects a fourfold bending of the light path from the original to the photosensitive surface, making for a very compact construction. Stray light is kept away from the photosensitive layer 11 by means of a light-shielding wall 15 provided with an exposure slot 15c.

Figure 7:
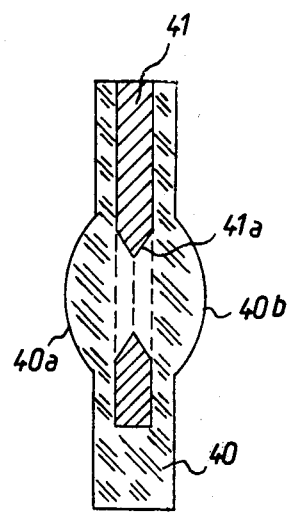
FIG. 7 depicts a lenticular bar molded around an embedded aperture plate.

FIG. 7, finally, depicts an individual lens bar 40 made of transparent synthetic plastic, injection molded around an aperture body 41 made of opaque synthetic plastic and provided with a row of apertures. The lens body 40 is provided with rows of lenticular portions 40a and 40b. Associated with each of the lenticular elements formed by cooperating ones of the lenticular portions 40a, 40b is a respective aperture 41a in aperture body 41. Each such aperture 41a is filled in by the material of the lens bar 40 itself, so that the aperture body 41 provides the diaphragms for the optical channels passing through the individual lenses 40a, 40b. Alternatively, the apertures for the optical channels could instead be established at a field-lens bar provided on its back with a reflective surface, i.e., of the type shown in the embodiments described above.

It will be understood that each of the elements described above, or two or more together, may also find a useful application in other types of constructions, differing from the types described above.

While the invention has been illustrated and described as embodied in systems using optical elements the lenticular and reflective layers of which are in direct contact, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a copying apparatus, in combination, means for supporting an original to be copied; means for supporting a recording medium; and projection means operative for projecting light from the original onto the recording medium; and means operative for effecting relative movement between the original and the projection means, the projection means comprising means operative during the relative movement for projecting onto the recording medium a gap-free image of the original by projecting onto the recording medium successive images of successive strip-shaped portions of the original, and including a plurality of optical elements at least two of which are of positive refractive power and operative for projecting an image of a strip-shaped portion of the original into an intermediate image plane and projecting the image in the intermediate image plane onto the recording medium, at least one of the optical elements comprising an element having a lenticular layer of positive refractive power and a reflective layer combined therewith to form a single structural unit, the reflective layer being oriented to introduce a fold into the light path of the projection means.

2. In an apparatus as defined in claim 1, the plurality of optical elements including a first lenticular objective bar acting as a projecting objective and operative for projecting an image of a strip-shaped section of the original into the intermediate image plane, a second lenticular objective bar acting as a projecting objective and operative for projecting the image in the intermediate image plane onto the recording medium, and a third lenticular bar constituting said at least one of the optical elements and having a lenticular front layer and a reflective back layer, the third lenticular bar being located in the region of the intermediate image plane and being operative as a non-projecting field lens.

3. In an apparatus as defined in claim 2, the surface portions of the original and of the recording medium from which and onto which the image of the strip-shaped portion of the original is projected at any one time being generally parallel to each other, the optical elements of positive refractive power being provided in the form of a double objective bar comprised of two rows of component objective elements, the double objective bar being arranged in front of the field-lens bar, further including first and second deflecting mirrors, the first operative for deflecting light from the original through one row of component objective elements and through the lenticular layer of the field-lens bar onto the reflective back layer of the latter, the second operative for deflecting onto the recording medium light reflected from the reflective back layer through the lenticular layer of the field-lens bar and through the other row of component objective elements, the deflecting mirrors, the field-lens bar and the double objective bar being so arranged that the light travelling through one row of component objective elements and also the light travelling through the other row of component objective elements travels therethrough in directions approximately parallel to said surface portions of the original and of the recording medium.

4. In an apparatus as defined in claim 3, the light travelling through each row of component objective elements passing therethrough in directions approximately parallel to said surface portions but at an angle to said surface portions, the double objective bar comprising two portions each containing a respective one of the two rows of component objective elements, the two portions of the double objective bar forming with each other an angle equal to approximately twice the angle which the light passing through the rows of component objective elements forms with said surface portions of the original and of the recording medium.

5. In an apparatus as defined in claim 1, the plurality of optical elements including a first lenticular objective bar acting as a projecting objective and operative for projecting an image of a strip-shaped section of the original into the intermediate image plane, a second lenticular objective bar acting as a projecting objective and operative for projecting the image in the intermediate image plane onto the recording medium, and a non-projecting field-lens structure comprised of two component field-lens bars located close to opposite sides of the intermediate image plane but spaced therefrom so as to leave the intermediate image plane in free space.

6. In an apparatus as defined in claim 1, the plurality of optical elements including a first lenticular objective bar acting as a projecting objective and operative for projecting an image of a strip-shaped section of the original into the intermediate image plane, a second lenticular objective bar acting as a projecting objective and operative for projecting the image in the intermediate image plane onto the recording medium, at least one of the lenticular objective bars constituting said at least one of the optical elements and comprising a row of concave mirrors of positive refractive power.

7. In an apparatus as defined in claim 1, the plurality of optical elements including a first lenticular objective bar acting as a projecting objective and operative for projecting an image of a strip-shaped section of the original into the intermediate image plane, a second lenticular objective bar acting as a projecting objective and operative for projecting the image in the intermediate image plane into the recording medium, and a lenticular field lens bar constituting said at least one of the optical elements and being located at the intermediate image plane operative as a non-projecting field lens and comprising a row of concave mirrors of positive refractive power.

8. In a copying apparatus, in combination, means for supporting an original to be copied; means for supporting a recording medium; and projection means operative for projecting light from the original onto the recording medium; and means operative for effecting relative movement between the original and the projection means, the projection means comprising means operative during the relative movement for projecting onto the recording medium a gap-free image of the original by projecting onto the recording medium successive images of successive strip-shaped portions of the original, and including a plurality of optical elements at least two of which are of positive refractive power and operative for projecting an image of a strip-shaped portion of the original into an intermediate image plane and projecting the image in the intermediate image plane onto the recording medium, at least one of the optical elements comprising an element having a lenticular layer of positive refractive power and a reflective layer combined therewith, the lenticular layer and reflective layer of said at least one of the optical elements being front and back layers forming a mirror objective and being so arranged that projection light projected from the original to the recording medium passes through the lenticular front layer twice.

9. In an apparatus as defined in claim 8, one of the optical elements being a field-lens bar containing the intermediate image plane.

10. In an apparatus as defined in claim 8, one of the optical elements being a field-lens structure comprised of two component field-lens bars located to opposite sides of the intermediate image plane spaced therefrom so as to leave the intermediate image plane in free space.

11. In an apparatus as defined in claim 8, two of said optical elements each being a mirror-objective having a lenticular front layer of positive refractive power and a reflective back layer the first of which receives light from the original and transmits such light to the second, the second transmitting the received light to the recording medium, the first and second such elements together establishing a projection light path of Z-shaped configuration.

12. In an apparatus as defined in claim 11, said first element being a field-lens bar, the second element being a mirror-objective bar, further including an objective bar positioned in the path of light from the original to the field-lens bar and integral with the mirror-objective bar.

13. In an apparatus as defined in claim 8, one of the optical elements being a field-lens bar in which the lenticular layer is a front layer and the reflective layer is a back layer.

14. In an apparatus as defined in claim 8, a first, a second and a third of said optical elements each having a lenticular front layer of positive refractive power and a reflective back layer, the first optical element being a first mirror-objective bar operative for receiving light from the original and projecting it in a different direction, the second optical element being a field-lens bar operative for receiving the light projected by the mirror-objective bar and projecting it in a different direction, the third optical element being a further mirror-objective bar integral with the first mirror-objective bar and operative for receiving the light from the field-lens bar and transmitting it in a different direction, and further including a deflecting mirror operative for receiving the light-transmitted by the further mirror-objective bar and transmitting the light onto the recording medium, the first and further mirror-objective bars, the field-lens bar and the deflecting mirror being arranged to establish a path of travel of projection light from the original to the recording medium having four bends.

15. In an apparatus as defined in claim 8, one of said optical elements comprising a lenticular bar of transparent synthetic plastic and embedded therein an apertured plate of opaque synthetic plastic the apertures of which cooperate with the lenticular elements of the lenticular bar.

16. In a copying apparatus, in combination, means for supporting an original to be copied; means for supporting a recording medium; and projection means operative for projecting light from the original onto the recording medium; and means operative for effecting relative movement between the original and the projection means, the projection means comprising means operative during the relative movement for projecting onto the recording medium a gap-free image of the original by projecting onto the recording medium successive images of successive strip-shaped portions of the original, and including a plurality of optical elements at least two of which are of positive refractive power and operative for projecting an image of a strip-shaped portion of the original into an intermediate image plane and projecting the image in the intermediate image plane onto the recording medium, at least one of the optical elements comprising an element having a lenticular layer of positive refractive power and a reflective layer combined therewith, a first of the optical elements comprising a row of concave mirrors of positive refractive power, a second of the optical elements comprising a field-lens bar provided with a row of concave mirrors of positive refractive power operative for receiving light transmitted by the first optical element, a third of the optical elements comprising a row of concave mirrors of positive refractive power arranged to receive light transmitted by the second optical element, and further including a deflecting mirror operative for receiving the light transmitted by the third optical element and transmitting the same onto the recording medium, the first, second and third optical elements and the deflecting mirror forming a projection light path having four bends.

* * * * *